United States Patent Office 3,071,524
Patented Jan. 1, 1963

3,071,524
REACTION OF OLEFINS BY RADIATION
Henry G. Schutze and Andrew D. Suttle, Jr., Baytown, Tex., assignors, by mesne assignments, to Esso Research and Engineering Company, Elizabeth, N.J., a corporation of Delaware
No Drawing. Filed Apr. 1, 1957, Ser. No. 649,645
9 Claims. (Cl. 204—154)

The present invention is directed to a method for converting a hydrocarbon. More particularly, the invention is concerned with converting an olefin by exposing same to ionizing radiation. In its more specific aspects, the invention is directed to reacting an olefin and a nitrogen compound while exposed to radiation.

The present invention may be briefly described as involving the conversion of a hydrocarbon by forming a gaseous mixture of an olefin and a nitrogen compound, such as ammonia, which is exposed in a radiation zone to the action of ionizing radiation for a sufficient length of time to form a product from the mixture and then recovering the product.

The hydrocarbon employed as a feed stock in the present invention is either a monoolefin or a diolefin having from about 2 to about 24 carbon atoms in the molecule. As examples of the monoolefins may be mentioned ethylene, propylene butylenes, pentylenes, hexylenes, heptylenes, octylenes, nonylenes, and the higher members of the same homologous series. Exemplary of the diolefins may be mentioned butadiene, pentadienes, hexadienes, heptadienes, octadienes and the higher members of the same homologous series. Other olefins, such as the triolefins as exemplified by the acetylenes, may also be employed under some circumstances. Generally, the olefins will boil in the range from the lowest boiling point of the specific examples of the feed stocks given up to about 650° F. Under some circumstances higher boiling olefins may form the feed stock.

The nitrogen compound forming a component of the feed stock of the present invention is preperably ammonia, although other derivatives of ammonia may suitably be used. For example, saturated, primary, secondary, or cyclic amines having from about 1 to about 12 carbon atoms may form the feed stock of the present invention. Exemplary of these amines may be mentioned the mono- or dimethylamines, ethylamines, the propylamines, such as normal- and iso-propylamine, cyclohexylamine, octylamine, decylamine and the higher members of the same series.

The temperature at which the reaction may be conducted may vary over a rather wide range from slightly above the boiling point of the hydrocarbon component of the feed stock up to about 750° F. Ordinarily, a temperature in the range from about 50° to about 350° F. may suffice. Pressures which may be employed ordinarily will be sufficient to maintain a gaseous or vapor phase, although pressures sufficient to maintain a liquid phase may be used. The pressure may range from about 0.01 to about 1000 pounds per square inch gauge.

The high energy ionizing radiation may suitably be obtained from a Van de Graaff generator, or may be obtained from a linear accelerator, a betatron, a high voltage transformer and rectifier, waste fission products from a nuclear reactor, such as spent fuel elements, or from materials especially made radioactive from neutron bombardment, such as cobalt 60, $Na^{24}$, $K^{42}$, $Ga^{72}$ and the like, and nuclear reactors.

The flux of ionizing radiation in the reaction zone may suitably be above about $10^3$ roentgens per hour, but may suitably range from about $10^3$ roentgens per hour to about $10^8$ roentgens per hour. The conditions may be adjusted such that the reactants receive a dosage of at least $10^3$ roentgens and preferably $10^{10}$ roentgens. When an accelerator is employed, cathode rays therefrom are employed having an energy level between about 0.01 and about 20 m.e.v. (million electron volts) and preferably between 0.1 and 10 m.e.v. Specifically employing a Van de Graaff generator, the invention may be practiced using beams having energy between about 1 and about 5 m.e.v. It is advantageous to use radiation of this energy level in that little, if any, radioactivity is introduced into the irradiated product and little, if any, nuclear reaction will be caused. Furthermore, the electrons have sufficient energy to penetrate into the reactants and the energy will not be lost in the walls while introducing the electrons into the system from their source.

In practicing the present invention, a reaction chamber is provided which is exposed to a suitable source of ionizing radiation. When a Van de Graaff generator is used, the reaction zone or chamber may suitably have a window through which the cathode rays are introduced. The window has a thickness limited only by the intensity of the beam introduced into the chamber. Metal foils are preferred since they sustain intense radiation and dissipate readily the heat which the irradiation releases as it is degraded on passing through the window.

In practicing the present invention the mixture of olefin and nitrogen containing compound is introduced into a reaction zone which may have at its head a thin aluminum window approximately 0.003" thick maintained between two neoprene gaskets. The bottom of the reaction zone may be shaped in a concave manner and provided with a drain leading into a sump in which high boiling materials are collected. The vapors are lead through a cold trap maintained at a sufficient low temperature to condense the liquids therefrom. A circulating pump may be employed to recycle unreacted reactants to the reaction zone.

The reaction chamber is placed beneath the window of a Van de Graaff generator which may be adjusted to produce a 2 m.e.v. beam of electrons adjusted to an intensity of about 150 microamps. to allow bombarding the reactants for about one hour at this intensity while the gases are continually circulated through the several traps to recover high boiling materials and to insure thorough and complete mixing during the reaction.

In order to illustrate the invention further, runs were made in which reactants were irradiated with a beam from a Van de Graaff generator adjusted to produce 2 m.e.v. electrons at an intensity of 150 microamps. The reaction zone was at atmospheric pressure, at a temperature of 86° F., and the reactants were irradiated for about 60 minutes.

An equal volumetric mixture of butene-1 and ammonia were irradiated for the stated period of time. A liquid product was obtained and was found to contain amines and olefins of alpha and beta unsaturation.

In another run under the same conditions, an equal volumetric mixture of butadiene and ammonia was irradiated to produce a product which contained amines, monoolefins, diolefins and triolefins.

From these examples, it may be seen that amines are produced from both mono- and diolefins and that the double bond, where the monoolefin was a feed stock, was shifted from the alpha position to the beta position. Also, where a diolefin was the feed stock monoolefins and triolefins were formed.

The present invention is of considerable importance and utility in that a method is devised for converting hydrocarbons by forming higher and lower boiling hydrocarbons therefrom and by shifting a double bond. Furthermore, the invention is important in forming from nitrogen compounds, such as ammonia, amines which are of more valuable nature and which suitably may be used for the purposes for which amines are employed. For example, it is known to use amines as solvents for extracting hydrocarbons and as antioxidants in the food and petroleum industry.

The nature and objects of the present invention having been completely described and illustrated, what we wish to claim as new and useful and secure by Letters Patent is:

1. A method for converting a hydrocarbon which comprises subjecting a feed mixture consisting of a monoolefin having alpha unsaturation and up to 24 carbon atoms in the molecule and a nitrogen compound selected from the group consisting of ammonia and the saturated primary, secondary and cyclic amines having from 1 to 12 carbon atoms in the molecule in an irradiation zone to radiation from a beam of electrons having an energy level in the range between about 0.01 and about 20 m.e.v. providing a dosage for the mixture in the range from $10^3$ to $10^{10}$ roentgens at a rate from $10^3$ to $10^8$ roentgens per hour at a temperature within the range from slightly above the boiling point of said olefin to about 750° F. and at a pressure from about 0.01 to about 1000 pounds per square inch gauge to form a product containing amines and monoolefins having beta unsaturation.

2. A method in accordance with claim 1 in which the the olefin in the feed mixture is butene-1.

3. A method in accordance with claim 1 in which the nitrogen compound in the feed mixture is ammonia.

4. A method in accordance with claim 1 in which the nitrogen compound in the feed mixture is a primary amine.

5. A method in accordance with claim 1 in which the nitrogen compound in the feed mixture is a secondary amine.

6. A method in accordance with claim 1 in which the nitrogen compound in the feed mixture is a cyclic amine.

7. A method in accordance with claim 1 in which the olefin and the nitrogen compound are in the gas phase.

8. A method in accordance with claim 1 in which the olefin has 4 carbon atoms in the molecule.

9. A method in accordance with claim 1 in which the mixture is exposed to about 2 m.e.v. at about atmospheric pressure and at a temperature of about 86° F. for about 60 minutes.

References Cited in the file of this patent

UNITED STATES PATENTS

| | | |
|---|---|---|
| 2,501,509 | Gresham et al. | Mar. 21, 1950 |
| 2,516,848 | Brasch | Aug. 1, 1950 |
| 2,520,181 | Teter et al. | Aug. 29, 1950 |
| 2,749,297 | Thomas | June 5, 1956 |
| 2,772,271 | Urry | Nov. 27, 1956 |

FOREIGN PATENTS

| | | |
|---|---|---|
| 309,001 | Great Britain | Apr. 2, 1929 |